United States Patent
Kim

(10) Patent No.: US 11,048,274 B2
(45) Date of Patent: Jun. 29, 2021

(54) ROUTE SETTING METHOD FOR UNDERWATER VEHICLE, UNDERWATER VEHICLE OPTIMUM CONTROL METHOD USING SAME, AND UNDERWATER VEHICLE

(71) Applicant: NATIONAL INSTITUTE OF MARITIME, PORT AND AVIATION TECHNOLOGY, Tokyo (JP)

(72) Inventor: Kangsoo Kim, Tokyo (JP)

(73) Assignee: National Institute of Maritime, Port, and Aviation Technology, Tokyo (JP)

( * ) Notice: Subject to any disclaimer, the term of this patent is extended or adjusted under 35 U.S.C. 154(b) by 462 days.

(21) Appl. No.: 15/781,566

(22) PCT Filed: Dec. 9, 2016

(86) PCT No.: PCT/JP2016/086723
§ 371 (c)(1),
(2) Date: Jun. 5, 2018

(87) PCT Pub. No.: WO2017/099219
PCT Pub. Date: Jun. 15, 2017

(65) Prior Publication Data
US 2019/0155310 A1  May 23, 2019

(30) Foreign Application Priority Data

Dec. 9, 2015 (JP) .............................. JP2015-240252

(51) Int. Cl.
*G06F 17/00* (2019.01)
*G05D 1/10* (2006.01)
(Continued)

(52) U.S. Cl.
CPC ................ *G05D 1/10* (2013.01); *B63C 11/00* (2013.01); *B63G 8/001* (2013.01); *G01C 21/005* (2013.01);
(Continued)

(58) Field of Classification Search
CPC ........ G05D 1/10; G05D 1/048; G05D 1/0875; B63C 11/00; B63C 11/48; B63G 8/001;
(Continued)

(56) References Cited

U.S. PATENT DOCUMENTS 5,894,450 A * 4/1999 Schmidt ................. H04B 13/02
367/134
6,390,012 B1 * 5/2002 Watt ........................ B63B 27/36
114/322
(Continued)

FOREIGN PATENT DOCUMENTS

CN 104180804 A 12/2014
JP 63-273797 11/1988
(Continued)

OTHER PUBLICATIONS

International Search Report for corresponding International Application No. PCT/JP2016/086723, dated Feb. 14, 2017.
(Continued)

*Primary Examiner* — Ronnie M Mancho
(74) *Attorney, Agent, or Firm* — Jason H. Vick; Sheridan Ross, PC

(57) ABSTRACT

The route setting method is provided with: an underwater waypoint input step for inputting underwater waypoints of the underwater vehicle; a target value setting step for setting initial target values at the underwater waypoints; an underwater navigation simulation step for simulating an underwater navigation route of the underwater vehicle by using water bottom topography data and the target values on the
(Continued)

basis of a dynamics model of the underwater vehicle; and a target value update step for updating the target values on the basis of an objective function which is calculated on the basis of the underwater navigation route obtained through the simulation in the underwater navigation simulation step. Optimum target values are derived by repeating the underwater navigation simulation step and the target value update step.

20 Claims, 8 Drawing Sheets

(51) Int. Cl.
    *B63C 11/00*     (2006.01)
    *G01C 21/20*     (2006.01)
    *G01C 21/00*     (2006.01)
    *B63G 8/00*     (2006.01)
    *G05D 1/04*     (2006.01)
    *G05D 1/08*     (2006.01)

(52) U.S. Cl.
    CPC ........... *G01C 21/20* (2013.01); *G01C 21/203* (2013.01); *G05D 1/048* (2013.01); *G05D 1/0875* (2013.01); *B63G 2008/004* (2013.01)

(58) Field of Classification Search
    CPC .. B63G 2008/004; B63G 8/00; G01C 21/005; G01C 21/20; G01C 21/203; G01V 1/38; B63B 27/16; B63B 25/00; B63B 25/0002
    USPC .......................................................... 701/21
    See application file for complete search history.

(56) References Cited

U.S. PATENT DOCUMENTS

| | | | | |
|---|---|---|---|---|
| 8,300,499 | B2* | 10/2012 | Coleman | G01S 15/8902 367/88 |
| 8,305,840 | B2* | 11/2012 | Maguire | G01S 15/96 367/88 |
| 8,463,458 | B2* | 6/2013 | Wood | G06T 11/206 701/2 |
| 9,013,953 | B2* | 4/2015 | Brizard | G01V 1/186 367/15 |
| 9,182,486 | B2* | 11/2015 | Brown | G01S 15/8902 |
| 9,829,602 | B2* | 11/2017 | Bond | G01V 8/02 |
| 9,969,470 | B2* | 5/2018 | Brizard | G01V 1/3852 |
| 9,995,824 | B2* | 6/2018 | Harvey | G01S 5/183 |
| 2004/0030571 | A1* | 2/2004 | Solomon | F41H 13/00 700/248 |
| 2005/0270905 | A1* | 12/2005 | Patterson | G01S 15/8902 367/88 |
| 2008/0300821 | A1* | 12/2008 | Frank | G01V 1/201 702/150 |
| 2009/0076670 | A1 | 3/2009 | Bandyopadhyay et al. | |
| 2009/0231953 | A1* | 9/2009 | Welker | G01V 1/3835 367/19 |
| 2011/0297070 | A1* | 12/2011 | Riggs | B63H 25/42 114/330 |
| 2011/0313655 | A1* | 12/2011 | Litvack | G01C 21/20 701/426 |
| 2012/0020185 | A1* | 1/2012 | Welker | G01V 1/3826 367/16 |
| 2012/0143808 | A1* | 6/2012 | Karins | G06N 7/005 706/46 |
| 2013/0269585 | A1* | 10/2013 | Kim | B63G 8/08 114/331 |
| 2014/0177387 | A1* | 6/2014 | Brizard | G01V 1/3808 367/15 |
| 2014/0301161 | A1* | 10/2014 | Brizard | G01V 1/3835 367/15 |
| 2015/0000582 | A1* | 1/2015 | Lelaurin | B63G 8/001 114/257 |
| 2015/0331130 | A1* | 11/2015 | Henman | G01V 1/3852 405/158 |
| 2015/0346722 | A1* | 12/2015 | Herz | G05D 1/0027 701/2 |
| 2016/0046358 | A1* | 2/2016 | Lelaurin | G01V 1/3852 114/312 |
| 2016/0050030 | A1* | 2/2016 | Riedl | G08C 23/02 367/133 |
| 2016/0076892 | A1* | 3/2016 | Zhou | B64D 47/08 701/3 |
| 2016/0097875 | A1* | 4/2016 | Kowalczyk | G05D 1/048 701/21 |
| 2016/0244135 | A1* | 8/2016 | Farber | B63G 8/001 |
| 2016/0251944 | A1* | 9/2016 | Carminati | E21B 43/36 114/321 |
| 2016/0253906 | A1* | 9/2016 | Celikkol | G08C 23/00 701/21 |
| 2016/0341554 | A1* | 11/2016 | Hillier | G08G 5/0013 |

FOREIGN PATENT DOCUMENTS

| | | |
|---|---|---|
| JP | 05-016878 | 1/1993 |
| JP | 2003-127983 | 5/2003 |
| JP | 2005-193767 | 7/2005 |
| JP | 2005-239027 | 9/2005 |
| JP | 2007-292729 | 11/2007 |
| JP | 2008-265651 A | 11/2008 |
| JP | 2013-141916 | 7/2013 |
| JP | 2014-121927 | 7/2014 |
| JP | 2015-063181 | 4/2015 |

OTHER PUBLICATIONS

Written Opinion for corresponding International Application No. PCT/JP2016/086723, dated Feb. 14, 2017.
Chen, Chen-Wei et al. "Modeling and Simulation of an AUV Simulator with Guidance System" IEEE Journal of Oceanic Engineering, vol. 38, No. 2, Apr. 2013: pp. 211-225.
Houts, Sarah E. et al. "Aggressive Terrain Following for Motion-Constrained AUVs" 2012 IEEE/OES Autonomous Underwater Vehicles (AUV); XP055597332; Sep. 1, 2012; pp. 1-7.
Hyakudome, Tadahiro et al. "The Experimental Results About Maneuverability and Survey Ability of AUV "Urashima"" Oceans 2010; IEEE, Piscataway, NJ, USA; XP031832793; Sep. 20, 2010; pp. 1-6.
Yoerger, Dana R., et al. "Fine-Scale Survey in Rugged Deep-Ocean Terrain with an Autonomous Robot" Robotics and Automation, 2000 Proceedings, ICRA '00, IEEE International Conference; XP 055597455; Jan. 2000; pp. 1787-1792.
Yoerger, Dana R., et al. "Techniques for Deep Sea Near Bottom Survey Using an Autonomous Underwater Vehicle" Robotics Research; Springer Berlin Heidelberg, Berlin, Heidelberg; XP055597461; Jan. 2007; pp. 416-429.
European Search Report for corresponding European Patent Application No. 16873112.3, dated Jun. 28, 2019.
Notice of Reasons for Refusal (Including Translation) for corresponding Japanese Patent Application No. 2015-240252, dated Nov. 26, 2019.
Chinese Office Action (including translation) for corresponding Chinese Application No. 2016800723050 dated Jul. 3, 2020.
International Preliminary Report on Patentability for corresponding International Application No. PCT/JP2016/086723, dated Jun. 21, 2018.
Office Action for corresponding European Patent Application No. 16873112.3, dated May 20, 2020.
Chinese Office Action (including translation) for corresponding Chinese Application No. 2016800723050 dated Sep. 12, 2019.
Chinese Office Action (including translation) for corresponding Chinese Application No. 2016800723050 dated Dec. 21, 2020.

* cited by examiner

ROUTE SETTING METHOD FOR UNDERWATER VEHICLE, UNDERWATER VEHICLE OPTIMUM CONTROL METHOD USING SAME, AND UNDERWATER VEHICLE

CROSS REFERENCE TO RELATED APPLICATIONS

This application is a national stage application under 35 U.S.C. 371 of PCT Application No. PCT/JP2016/086723 having an international filing date of 9 Dec. 2016, which designated the United States, which PCT application claimed the benefit of Japanese Application No. 2015-240252 filed 9 Dec. 2015, each of which are incorporated herein by reference in their entirety.

TECHNICAL FIELD

The present invention relates to a route setting method for an underwater vehicle, an optimum control method for an underwater vehicle using the same, and an underwater vehicle.

BACKGROUND

In recent years, the underwater bottom is drawing attention as a supply source of all resources ranging from mineral resources. Accordingly, there has been an increasing necessity for inspecting the underwater bottom. In the inspection of the underwater bottom, a remote sensing method using signals such as sonic waves, lasers, visible light, and electromagnetic waves is normally employed. However, since these signals suffer a propagation loss, these signals are used at positions as close as possible to the underwater bottom in order to obtain information of high resolution and high accuracy. Therefore, there is a need for a technology that enables an underwater vehicle (for example, a submersible vessel) to navigate (sails) on a desired route and in a desired attitude near the underwater bottom.

There is disclosed a technique that the underwater vehicle is provided with a depth setting unit to set a depth thereof, and performs control on driving of stern steering on the basis of a predetermined depth (Patent Document 1). Herein, a limit circuit is provided between the depth setting unit and a depth control unit such that the underwater vehicle is controlled so as not to come into contact with the underwater bottom.

In relation to an automatic pilot of the underwater vehicle, there is disclosed a technique that an estimation accuracy of a dynamic state quantity is improved using a dynamic model to trace a dynamic characteristic of the underwater vehicle in order to estimate its dynamic state (Patent Document 2). In addition, there is disclosed a technique of controlling the steering of the underwater vehicle in consideration of an influence of tidal currents (Patent Document 3).

In addition, there is a need to acquire an accurate position of the underwater vehicle to control the navigation of the underwater vehicle. Moreover, there is disclosed a positioning technique in which the depths are measured at a plurality of positions using a multi-beam depth sounder to specify the position of the underwater vehicle (Patent Document 4). There is disclosed a technique in which the vehicle state information such as a speed, a depth, a height, and an attitude of the underwater vehicle is acquired, a safety region for a safe navigation is set on the basis of the state information, and the underwater vehicle is controlled to navigate in the safety region (Patent Document 5).

CITATION LIST

Patent Literature

Patent Document 1: JP 63-273797 A
Patent Document 2: JP 05-016878 A
Patent Document 3: JP 2003-127983 A
Patent Document 4: JP 2007-292729 A
Patent Document 5: JP 2015-063181 A

SUMMARY

Technical Problem

A reflection intensity of an inspection signal such as a sonic wave is in inverse proportion to an incident angle to the underwater bottom. In other words, the reflection intensity is remarkably weakened compared to a normal incidence (an incident angle of "0") when the incident angle is large at a region which is shallow with respect to the underwater bottom. Therefore, in a case where a submarine topography has complicate ups and downs, an intensity of a reflection signal is correlated to the topography and is weak compared to a case where the submarine topography is flat. Further, in a complicated submarine topography the problem of multipath is remarkable compared to a flat underwater bottom. As a result, a height of a vehicle measured by a height indicator is lowered in reliability.

For such a reason, a height-based vertical control of a vehicle is rarely employed in view of the safe navigation except a case where information of the height is stably obtained with high accuracy similarly to the flat underwater bottom, but a depth-based vertical control of a vehicle is employed in many cases.

In an actual situation, when the depth control is applied to underwater vehicle navigation, a target depth is set such that the underwater vehicle is controlled to be safe from the bottom collision. However, a relation between a submarine topography and the dynamics of an underwater vehicle is extremely difficult to be evaluated in setting the target depth. Further, in a rough submarine topography there is a concern of bottom collision. On the other hand, when the target depth is set to make the underwater vehicle separated from the underwater bottom by a sufficient distance in order to avoid bottom collision, the quality of data obtained from the underwater bottom and the resolution are remarkably degraded. Therefore, in practice, the target depth is set to make the underwater vehicle appropriately separated from the underwater bottom on the basis of experience and intuition. In addition, the underwater vehicle may take a specific attitude (for example, an attitude parallel to the underwater bottom) according to a type of sensor used in the inspection of the underwater bottom. In this case, it is desirable that the underwater vehicle navigate on a route approximating most to the slopes of the underwater bottom while avoiding collision with the underwater bottom.

There is no consideration in all of Patent Documents 1 to 5 about a configuration that an underwater waypoint is determined in order to obtain an optimum underwater navigation route which can make the underwater vehicle approach the underwater bottom while preventing collision with the underwater bottom.

The invention has been made in view of at least one of the above problems, and an object thereof is to provide a route setting method for an underwater vehicle, an optimum control method for an underwater vehicle using the same, and the underwater vehicle, so that an optimum route is set with respect to a reference to make the underwater vehicle controlled to navigate.

Solution to Problem

A route setting method for an underwater vehicle according to the present invention includes: inputting an underwater waypoint of an underwater vehicle; setting an initial target value in the underwater waypoint; simulating an underwater navigation route of the underwater vehicle with respect to the target value on the basis of a dynamic model of the underwater vehicle using data of a submarine topography as a reference and the target value; and updating the target value on the basis of an objective function which is calculated on the basis of the underwater navigation route obtained in the simulating of the underwater navigation, wherein the target value is optimized by repeatedly performing the simulation of the underwater navigation and the updating of the target value.

Here, the target value is preferably a target depth in the underwater waypoint.

Furthermore, the route setting method for an underwater vehicle preferably further includes: setting a minimum allowable height of the underwater vehicle, and in the simulation of the underwater navigation, a calculated underwater navigation height of the underwater vehicle with respect to the target depth is preferably simulated on the basis of the dynamic model of the underwater vehicle using the data of the submarine topography and the target depth, and the calculated underwater navigation height and the minimum allowable height are preferably compared to derive the optimum target depth.

Furthermore, in the updating of the target value, the target depth is preferably updated such that a minimum value of the calculated underwater navigation height approaches the minimum allowable height in a case where there is a difference between the minimum value of the calculated underwater navigation height and the minimum allowable height.

Furthermore, a value of the objective function is preferably a total sum of absolute values of differences between the calculated underwater navigation heights at a plurality of the underwater waypoints and the minimum allowable height, or a total sum of squares of the differences, and in the updating of the target value, the target depth is preferably updated such that the value of the objective function is decreased.

Furthermore, the target value is preferably a target height at the underwater waypoint.

Furthermore, the route setting method for an underwater vehicle preferably further includes: setting a minimum allowable height of the underwater vehicle, and in the simulation of the underwater navigation, a calculated underwater navigation height of the underwater vehicle with respect to the target height is preferably simulated on the basis of the dynamic model of the underwater vehicle using the data of the submarine topography and the target height, and the calculated underwater navigation height and the minimum allowable height are preferably compared to derive the optimum target height.

Furthermore, in the updating of the target value, the target height is preferably updated such that a minimum value of the calculated underwater navigation height approaches the minimum allowable height in a case where there is a difference between the minimum value of the calculated underwater navigation height and the minimum allowable height.

Furthermore, a value of the objective function is preferably a total sum of absolute values of differences between the calculated underwater navigation heights at a plurality of the underwater waypoints and the minimum allowable height, or a total sum of squares of the differences, and in the updating of the target value, the target height is preferably updated such that the value of the objective function is decreased.

Here, the target value is preferably a target reference attitude of the underwater vehicle at the underwater waypoint.

Furthermore, the route setting method for an underwater vehicle preferably further includes: setting a minimum allowable height of the underwater vehicle, and in the simulation of the underwater navigation, a calculated underwater navigation height of the underwater vehicle with respect to the target reference attitude is preferably simulated on the basis of the dynamic model of the underwater vehicle using the data of the submarine topography and the target reference attitude, and the calculated underwater navigation height and the minimum allowable height are preferably compared to derive the optimum target reference attitude.

Furthermore, in the updating of the target value, the target reference attitude is preferably updated such that a minimum value of the calculated underwater navigation height approaches the minimum allowable height in a case where there is a difference between the minimum value of the calculated underwater navigation height and the minimum allowable height.

Furthermore, a value of the objective function is preferably a total sum of absolute values of differences between the calculated underwater navigation heights at a plurality of the underwater waypoints and the minimum allowable height, or a total sum of squares of the differences, and in the updating of the target value, the target reference attitude is preferably updated such that the value of the objective function is decreased.

Furthermore, the number of repetitions of the simulation of the underwater navigation and the updating of the target value is preferably set in advance.

Furthermore, a reference route is preferably used instead of the data of the submarine topography. In addition, a reference attitude of the underwater vehicle at the underwater waypoint is preferably used instead of the data of the submarine topography. Furthermore, reference attitude angles of the underwater vehicle at the underwater waypoint are preferably used instead of the data of the submarine topography.

An optimum control method for an underwater vehicle according to the present invention includes controlling the underwater vehicle using the optimum target value obtained in the route setting method for an underwater vehicle described above.

Furthermore, the optimum target value and a position of the underwater vehicle are preferably compared to control a motion control system of the underwater vehicle according to a comparison result.

Furthermore, the underwater vehicle preferably surfaces urgently in a case where the optimum target value and the position of the underwater vehicle deviate from a predetermined condition.

Furthermore, an observation control is preferably performed to observe a submarine topography.

An underwater vehicle according to the present invention preferably includes: a target value acquisition unit which acquires the optimum target value acquired in the route setting method for an underwater vehicle described above; a storage unit which stores the acquired target value; and a motion control unit which controls a drive unit using the target value stored in the storage unit.

Here, the underwater vehicle preferably further includes: at least one of a depth measuring unit, a height measuring unit, and a attitude measurement unit, and the motion control unit preferably compares a measurement value of at least one of the depth measuring unit, the height measuring unit, and the attitude measurement unit with the target value stored in the storage unit to control the drive unit.

Furthermore, the underwater vehicle preferably further includes: an obstacle detection unit, and the motion control unit preferably controls the drive unit according to a detection result of the obstacle detection unit.

Furthermore, the underwater vehicle preferably further includes: an inertial navigation unit, and the motion control unit preferably controls the drive unit on the basis of an output of the inertial navigation unit.

Furthermore, the underwater vehicle preferably further includes: an observation unit which observes a submarine topography.

Advantageous Effects of Invention

A route setting method for an underwater vehicle according to claim 1 includes inputting an underwater waypoint of an underwater vehicle, setting an initial target value in the underwater waypoint, simulating an underwater navigation route of the underwater vehicle with respect to the target value on the basis of a dynamic model of the underwater vehicle and the data of a submarine topography as a reference and the target value, and updating the target value on the basis of an objective function which is calculated on the basis of the underwater navigation route obtained in the simulation of the underwater navigation. The target value is optimized by repeatedly performing the simulation of the underwater navigation and the updating of the target value. Therefore, it is possible to set an optimum target value which is optimized to the submarine topography at the underwater waypoint. With this configuration, the underwater vehicle can navigate underwater with an optimum target value at the underwater waypoint. Further, it is possible to set a route which can realize the navigation in an optimum navigation state according to a purpose.

Herein, the target value is a target depth at the underwater waypoint. Therefore, it is possible to set an optimum target depth which is optimized to the submarine topography at the underwater waypoint. With this configuration, the underwater vehicle can navigate to be the optimum target depth at the underwater waypoint. Further, it is possible to set a route which can realize the navigation of the optimum depth according to a purpose such as observation.

In addition, the route setting method for an underwater vehicle includes setting a minimum allowable height of the underwater vehicle. In the simulation of the underwater navigation, a calculated underwater navigation height of the underwater vehicle with respect to the target depth is simulated on the basis of the dynamic model of the underwater vehicle using the data of the submarine topography and the target depth, and the calculated underwater navigation height and the minimum allowable height are compared to derive the optimum target depth. Therefore, it is possible to set a route in which the underwater vehicle navigates underwater to be the optimum target depth at the underwater waypoint while avoiding the underwater vehicle from approaching the underwater bottom below the minimum allowable height.

In addition, in the updating of the target value, the target depth is updated such that a minimum value of the calculated underwater navigation height approaches the minimum allowable height in a case where there is a difference between the calculated underwater navigation height and the minimum allowable height. Therefore, it is possible to set the optimum target depth such that the underwater vehicle approaches the underwater bottom as close as possible at the underwater waypoint while avoiding the underwater vehicle from approaching the underwater bottom below the minimum allowable height.

In addition, the objective function is a total sum of absolute values of differences between the calculated underwater navigation heights at a plurality of the underwater waypoints and the minimum allowable height, or a total sum of squares of the differences. In the updating of the target value, the target depth is updated such that the objective function is decreased. Therefore, it is possible to set the optimum target depths at the plurality of underwater waypoints such that a total sum of absolute values of differences between the calculated underwater navigation heights at the plurality of underwater waypoints and the minimum allowable height, or a total sum of squares of the differences is minimized.

In addition, the target value is a target height at the underwater waypoint. Therefore, it is possible to set an optimum target height which is optimized to the submarine topography at the underwater waypoint. With this configuration, the underwater vehicle can navigate to be the optimum target height at the underwater waypoint. Further, it is possible to set a route which can realize the navigation of the optimum underwater navigation height according to a purpose such as observation.

In addition, the route setting method for an underwater vehicle includes setting a minimum allowable height of the underwater vehicle. In the simulation of the underwater navigation, a calculated underwater navigation height of the underwater vehicle with respect to the target height is simulated on the basis of the dynamic model of the underwater vehicle using the data of the submarine topography and the target height, and the calculated underwater navigation height and the minimum allowable height are compared to derive the optimum target height. Therefore, it is possible to set a route in which the underwater vehicle navigates underwater to be the optimum height at the underwater waypoint while avoiding the underwater vehicle from approaching the underwater bottom below the minimum allowable height.

In addition, in the updating of the target value, the target height is updated such that a minimum value of the calculated underwater navigation height approaches the minimum allowable height in a case where there is a difference between the calculated underwater navigation height and the minimum allowable height. Therefore, it is possible to set the optimum target height such that the underwater vehicle approaches the underwater bottom as close as possible at the underwater waypoint while avoiding the underwater vehicle from approaching the underwater bottom below the minimum allowable height.

In addition, the objective function is a total sum of absolute values of differences between the calculated underwater navigation heights at a plurality of the underwater waypoints and the minimum allowable height, or a total sum of squares of the differences. In the updating of the target value, the target height is updated such that the objective function is decreased. Therefore, it is possible to set the optimum target heights at the plurality of underwater waypoints such that a total sum of absolute values of differences between the calculated underwater navigation heights at the plurality of underwater waypoints and the minimum allowable height, or a total sum of squares of the differences is minimized.

Herein, the target value is a target reference attitude of the underwater vehicle at the underwater waypoint. Therefore, it is possible to set an optimum target reference attitude which is optimized to the submarine topography at the underwater waypoint. With this configuration, the underwater vehicle can navigate to be the optimum target reference attitude at the underwater waypoint. Further, it is possible to set a route which can realize the navigation of the optimum underwater navigation attitude according to a purpose such as observation.

In addition, in the simulating of the underwater navigation, a calculated underwater navigation height of the underwater vehicle with respect to the target reference attitude is simulated on the basis of the dynamic model of the underwater vehicle using the data of the submarine topography and the target reference attitude, and the calculated underwater navigation height and the minimum allowable height are compared to derive the optimum target reference attitude. Therefore, it is possible to set a route in which the underwater vehicle navigates underwater to be the optimum target reference attitude at the underwater waypoint while avoiding the underwater vehicle from approaching the underwater bottom below the minimum allowable height.

In addition, in the updating of the target value, the target reference attitude is updated such that a minimum value of the calculated underwater navigation height approaches the minimum allowable height in a case where there is a difference between the minimum value of the calculated underwater navigation height and the minimum allowable height. Therefore, it is possible to set the optimum target reference attitude such that the underwater vehicle approaches the underwater bottom as close as possible at the underwater waypoint while avoiding the underwater vehicle from approaching the underwater bottom below the minimum allowable height.

In addition, a value of the objective function is a total sum of absolute values of differences between the calculated underwater navigation heights at a plurality of the underwater waypoints and the minimum allowable height, or a total sum of squares of the differences. In the updating of the target value, the target reference attitude is updated such that the value of the objective function is decreased. Therefore, it is possible to set the optimum target reference attitude at the plurality of underwater waypoints such that a total sum of absolute values of differences between the calculated underwater navigation heights at the plurality of underwater waypoints and the minimum allowable height, or a total sum of squares of the differences is minimized.

In addition, the number of repetitions of the simulating of the underwater navigation and the updating of the target value is set in advance. Therefore, it is possible to complete an underwater navigation simulation an appropriate number of times.

In addition, a reference route is used instead of the data of the submarine topography. Alternatively, reference attitude angles of the underwater vehicle in the underwater waypoint are used instead of the data of the submarine topography. Therefore, it is possible to optimize the target value such that the underwater vehicle approaches the reference route or the reference attitude angles at the underwater waypoint.

An optimum control method for an underwater vehicle according to the present invention preferably controls the underwater vehicle using the optimum target value obtained in the route setting method for the underwater vehicle. Therefore, it is possible that the underwater vehicle navigates underwater with the optimum target value which is optimized to the submarine topography at the underwater waypoint. Further, it is possible to set a route which can realize the navigation in an optimum navigation state according to a purpose.

Herein, the optimum target value and a position of the underwater vehicle are compared to control a motion control system of the underwater vehicle according to a comparison result. Therefore, it is possible to specifically realize the optimum control method for the underwater vehicle.

In addition, the underwater vehicle urgently in a case where the optimum target value and the position of the underwater vehicle deviate from a predetermined condition. Therefore, it is possible to avoid a risk such as a case where the underwater vehicle is about to collide with an obstacle.

In addition, an observation control is performed to observe a submarine topography. Therefore, it is possible to perform observation while navigating in the underwater navigation state which is appropriate to the observation.

An underwater vehicle according to the present invention preferably includes a target value acquisition unit which acquires the optimum target value acquired in the route setting method for the underwater vehicle, a storage unit which stores the acquired target value, and a motion control unit which controls a drive unit using the target value stored in the storage unit. Therefore, it is possible to perform the underwater navigation with the optimum target value which is optimized to the submarine topography at the underwater waypoint. Further, it is possible to set a route which can realize the navigation in an optimum navigation state according to a purpose.

Herein, the underwater vehicle includes at least one of a depth measuring unit, a height measuring unit, and an attitude measurement unit. The motion control unit compares a measurement value of at least one of the depth measuring unit, the height measuring unit, and the attitude measurement unit with the target value stored in the storage unit to control the drive unit. Therefore, it is possible to specifically realize the optimum control method for the underwater vehicle which obtains the optimum target value.

In addition, the underwater vehicle includes an obstacle detection unit. The motion control unit controls the drive unit according to a detection result of the obstacle detection unit. Therefore, it is possible to avoid a risk such as a case where the underwater vehicle is about to collide with an obstacle.

In addition, the underwater vehicle includes an inertial navigation unit. The motion control unit controls the drive unit on the basis of an output of the inertial navigation unit. Therefore, it is possible to set the optimum target value which is optimized to the submarine topography at the underwater waypoint only by the subject vehicle without acquiring the position information from the outer side.

In addition, the underwater vehicle includes an observation unit which observes a submarine topography. Therefore, it is possible to perform observation while navigating in the underwater navigation state which is appropriate to the observation.

DESCRIPTION OF EMBODIMENTS

<System Configuration>

Figure 8:
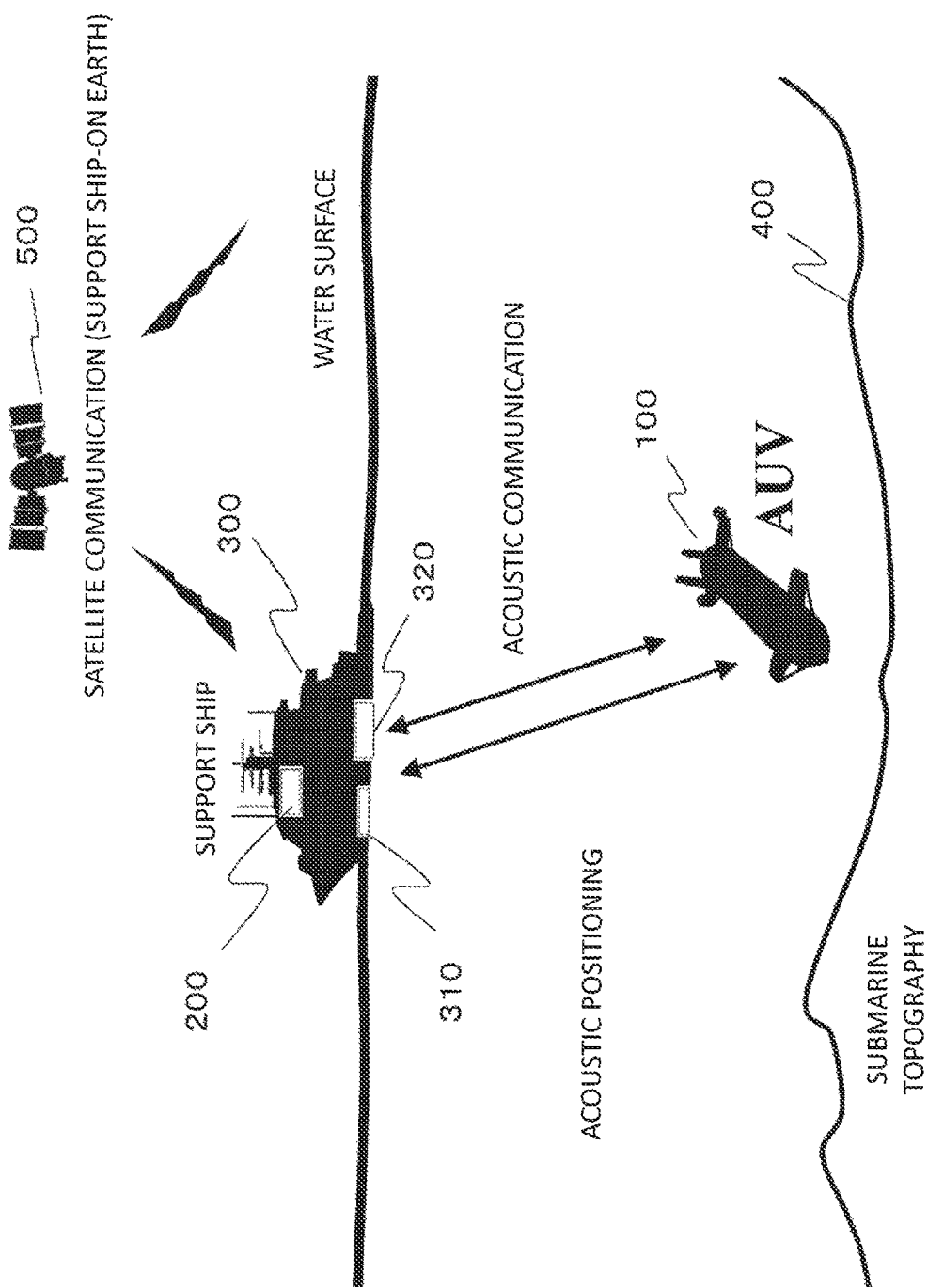
FIG. 8 is a diagram illustrating an observation system of a submarine topography using the underwater vehicle according to the embodiment of the invention.

FIG. 8 is a diagram illustrating an observation system of a submarine topography using an underwater vehicle according to an embodiment of the invention. The observation system is configured by an underwater vehicle 100 which submerges into the water, a route setting device 200, and a support ship 300 on the water, on which the route setting device is mounted. The underwater vehicle 100 navigates along an optimum underwater navigation route which is set to make a closest approach to the underwater bottom while preventing collision in order to observe a submarine topography 400 at an underwater waypoint. The support ship 300 receives a GPS signal from a satellite 500 to determine its own geographical position. Therefore, a geographical position of the underwater vehicle 100 can be known. In the support ship 300, an acoustic positioning device 310 is mounted, so that a relative position of the underwater vehicle 100 in the water from the support ship 300 can be ascertained. In addition, the underwater vehicle 100 can detect the relative position to the support ship 300 using a position detection unit mounted in the underwater vehicle 100. The support ship 300 and the underwater vehicle 100 both can ascertain the relative position through an acoustic communication device 320. Therefore, the geographical position of the underwater vehicle 100 can be ascertained in the support ship 300 and/or the underwater vehicle 100 by combining the geographical position obtained in the support ship 300 and the relative position obtained in the acoustic positioning device 310 or the position detection unit of the underwater vehicle 100.

<Configuration of Underwater Vehicle>

Figure 1:
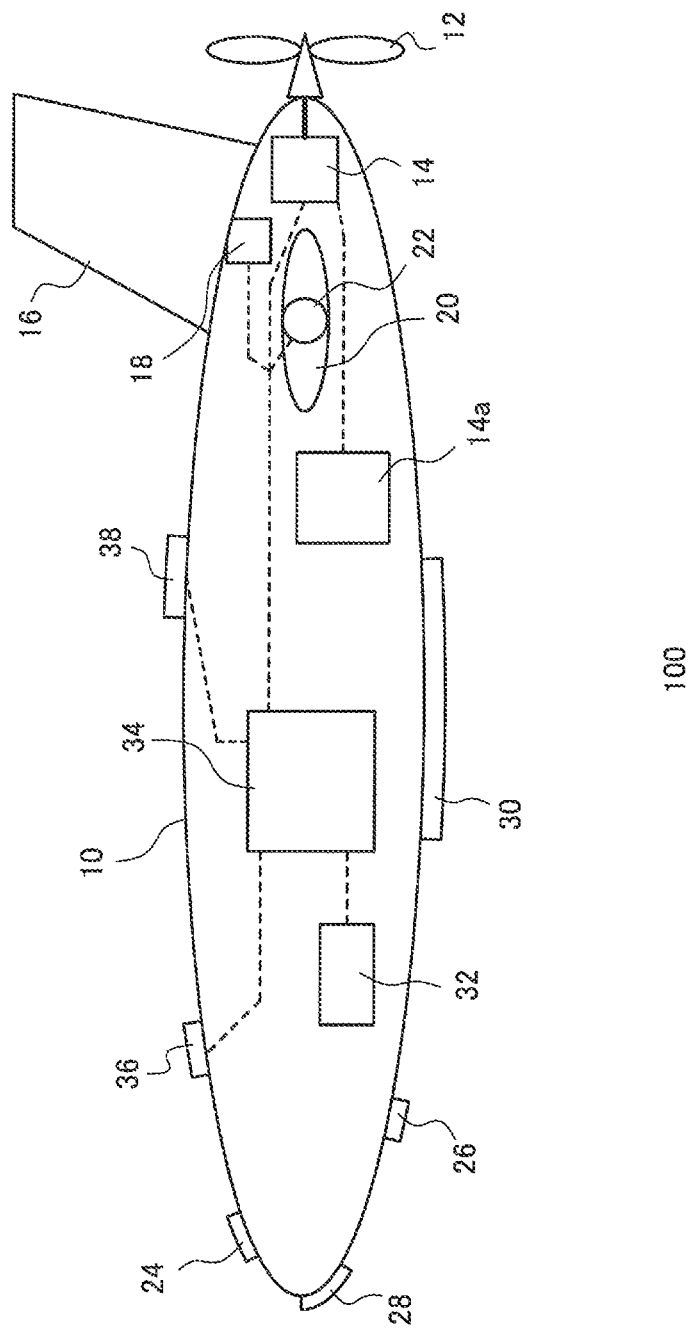
FIG. 1 is a conceptual diagram illustrating a configuration of an underwater vehicle according to an embodiment of the invention.

As illustrated in a conceptual diagram of FIG. 1, the underwater vehicle 100 according to the embodiment of the invention is configured by a hull 10, a main propeller 12, a main propeller drive motor 14, a vertical rudder 16, a vertical rudder drive motor 18, a horizontal rudder 20, a horizontal rudder drive motor 22, a depth indicator 24, a height indicator 26, an obstacle sensor 28, an observation sensor 30, an inertial navigation device 32 which is a position detection unit, a control device 34, an acoustic communication device 36, and an acoustic positioning device 38. The underwater vehicle 100 is, for example, an autonomous underwater vehicle (AUV), but the invention is not limited thereto.

The hull 10 is a sealable structure which makes spaces such as cabins. The hull 10 is configured by a metal or reinforced plastic material, and also serves to mechanically support components of the underwater vehicle 100.

The main propeller 12 is a component which generates a driving force to propel the underwater vehicle 100. The main propeller 12 is configured by a propeller and a rotation shaft, for example. The main propeller drive motor 14 is a motor to apply the driving force to the main propeller 12. The main propeller drive motor 14 receives a drive control signal from the control device 34 to rotatably drive the rotation shaft of the main propeller 12 by power from a battery 14a at the rotation number and torque according to the drive control signal. With this configuration, the propeller connected to the drive shaft is rotated, and applies a propulsive force to the underwater vehicle 100.

The vertical rudder 16 is a rudder to turn (revolve) the hull 10 in the right and left direction. The hull 10 can be revolved to the left or right side by inclining the vertical rudder 16 to the right or left side with respect to the hull 10. The vertical rudder drive motor 18 is a motor to generate a driving force to rotate the vertical rudder 16. The vertical rudder drive motor 18 receives a vertical steering control signal from the control device 34 to rotatably drive the vertical rudder 16 to form attitude angles corresponding to the vertical steering control signal.

Further, the hull 10 may be configured to turn (revolve) in the right and left direction such that the main propellers 12 are individually provided on the right and left sides to balance the propulsive force of the right and left main propellers 12 without depending on the vertical rudder 16.

The horizontal rudder 20 is a rudder to raise and fall the hull 10. The hull 10 can pitch up or down by inclining up or down the horizontal rudder 20 with respect to the hull 10. The horizontal rudder drive motor 22 is a motor to generate a driving force to rotate the horizontal rudder 20. The horizontal rudder drive motor 22 receives a horizontal steering control signal from the control device 34 to rotatably drive the horizontal rudder 20 to form attitude angles corresponding to the horizontal steering control signal.

The depth indicator 24 is a device which measures a distance (depth) from the water surface of the underwater vehicle 100 and outputs the distance. The depth indicator 24 measures a depth from a water pressure applied to the hull 10 of the underwater vehicle 100 for example. The depth indicator 24 outputs the measured depth to the control device 34. The height indicator 26 is a device which measures a distance (height) from the underwater bottom to the underwater vehicle 100, and outputs the distance. The height indicator 26 outputs sonic waves to the lower side of the hull 10 for example, and measures the height on the basis of a time taken until the sonic waves reflected on the underwater bottom are received. The height indicator 26 outputs the measured height to the control device 34.

The obstacle sensor 28 is a sensor to detect an obstacle which exists in an advancing direction (front side) of the underwater vehicle 100. The obstacle sensor 28 outputs the sonic waves to the front side (or in a slightly lower direction on the front side) of the hull 10, for example. The obstacle sensor measures the presence of an obstacle and a distance thereto on the basis of a time taken until the sonic waves reflected on the obstacle on the front side are received. The obstacle sensor 28 outputs a detection result of the obstacle to the control device 34.

The observation sensor 30 is a sensor for the observation of the underwater vehicle 100. The observation sensor 30 may be configured by various sensors according to the purpose of the observation. The observation sensor 30 may be configured by a sonic wave sensor, an electromagnetic wave sensor, an optical sensor, a pressure sensor, and a thermal sensor, for example. The observation sensor 30 outputs an observed result to the control device 34.

The inertial navigation device 32 includes an acceleration sensor and a gyro sensor which measure an acceleration when the hull 10 moves. Position information of the hull 10 is obtained by twice integrating the accelerations measured by these sensors with respect to time. The position information of the underwater vehicle 100 obtained by the control device 34 is output to the control device 34.

The control device 34 receives information from the depth indicator 24, the height indicator 26, the obstacle sensor 28, the observation sensor 30, and the inertial navigation device 32, and controls the navigation of the underwater vehicle 100 on the basis of the information. The control device 34 controls the main propeller 12, the vertical rudder drive motor 18, and the horizontal rudder drive motor 22 on the basis of the position information from the inertial navigation device 32, the depth from the depth indicator 24, and height information from the height indicator 26. Therefore, the hull 10 approaches a predetermined underwater waypoint and a target value (a target depth, a target height, a target attitude, a target attitude angle, etc.) which is set by a route setting method (described below). Navigation control of the control device 34 will be described below.

The acoustic communication device 36 is a device which communicates with the outer side of the underwater vehicle 100 through the sonic waves. The acoustic communication device 36 receives information about the results and the navigation from the control device 34 which are measured by the depth indicator 24, the height indicator 26, the obstacle sensor 28, the observation sensor 30, and the inertial navigation device 32. The acoustic communication device 36 transmits the information to the outer side of the underwater vehicle 100 (for example, a ship on the sea). In addition, the acoustic communication device receives an absolute position which is measured by a GPS in the outer side (for example, a ship on the sea).

The acoustic positioning device 38 receives the relative position between the underwater vehicle 100 and a ship on the outer side. When being provided in a ship on the sea, the acoustic positioning device 38 acquires information of the relative position of the underwater vehicle 100. The relative position information is input to the control device 34. The control device 34 acquires information of an absolute position of the ship on the sea which is acquired by the acoustic communication device 36. The control device can obtain an absolute position of the underwater vehicle 100 from the absolute position of the ship and the relative position of the underwater vehicle 100. The control device 34 can correct the position information acquired from the inertial navigation device 32 using the absolute position information of the underwater vehicle 100 thus acquired. For example, the control device 34 corrects the position of the inertial navigation device 32 using the position of the acoustic positioning device 38 in a case where a difference between the position calculated from the relative position information acquired from the acoustic positioning device 38 and the position acquired from the inertial navigation device 32 is larger than a predetermined value. The inertial navigation device 32 keeps estimating the position of the underwater vehicle 100 using the corrected position as a new initial value.

<Route Setting Method for Underwater Vehicle>

A route setting process of the underwater vehicle 100 according to this embodiment will be described below. In this embodiment, the description will be given about a case where the route setting is performed by the route setting device 200 separated from the underwater vehicle 100. In this case, the invention is not limited to the above configuration, and the route setting device 200 may be mounted in the underwater vehicle 100.

Figure 2:
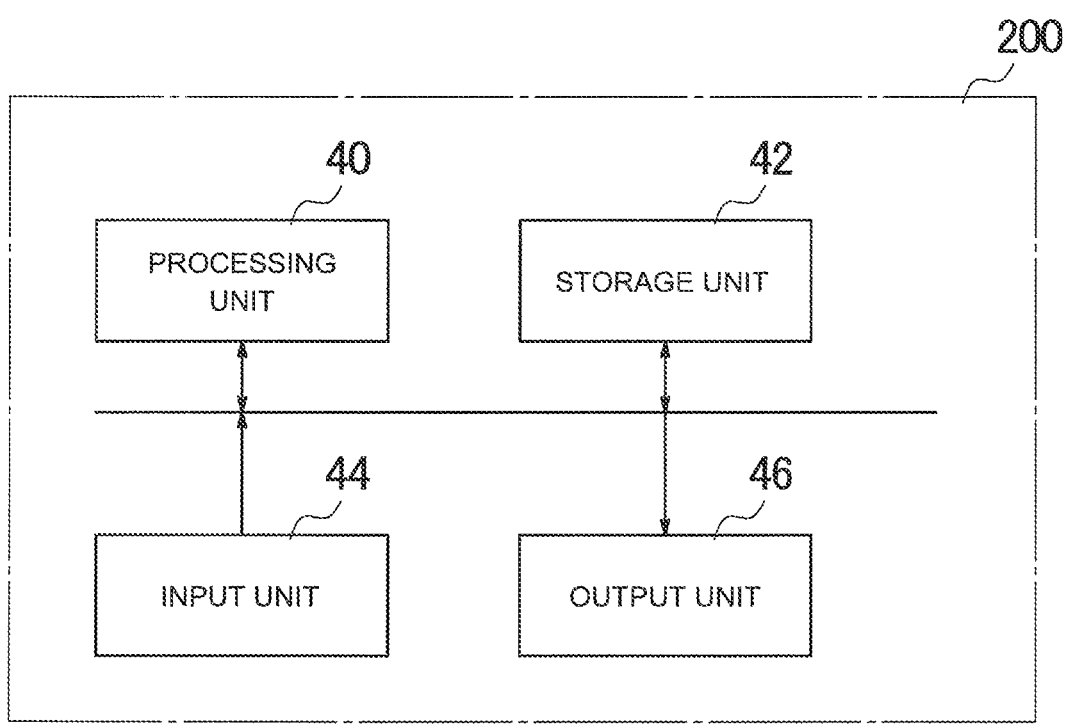
FIG. 2 is a diagram illustrating a configuration of a route setting device of the underwater vehicle according to the embodiment of the invention.

As illustrated in FIG. 2, the route setting device 200 is a computer which includes a processing unit 40, a storage unit 42, an input unit 44, and an output unit 46. The processing unit 40 is configured by a CPU. The processing unit 40 performs the route setting process (described below) by executing a route setting program which is stored in the storage unit 42 in advance. The storage unit 42 is a storage device to store the route setting program, a hull motion calculation model, and various types of data. The storage unit 42 may be a semiconductor memory and a hard disk, for example. The input unit 44 includes a device which inputs information to the route setting device 200 to perform the route setting process. The input unit 44 may be a keyboard, a mouse, and a touch panel. In addition, the input unit 44 may acquire information from other devices through a network interface. The output unit 46 includes a device to output information of a route obtained by the route setting device 200. The output unit 46 may be a display and a printer. In addition, information may be output to the control device 34 of the underwater vehicle 100 through the output unit 46 as the network interface.

Figure 3:
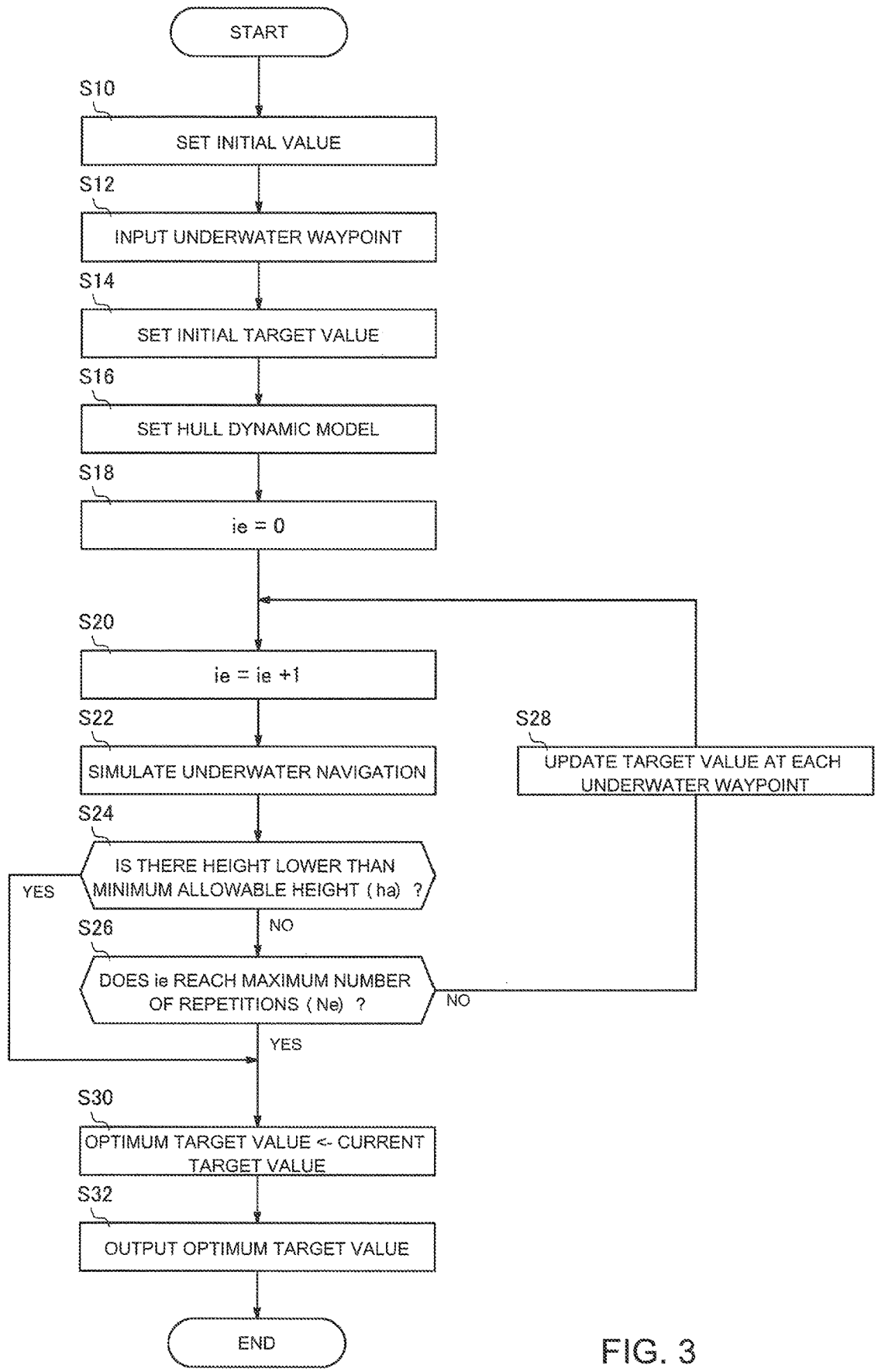
FIG. 3 is a flowchart of a route setting method for the underwater vehicle according to the embodiment of the invention.
Figure 4:
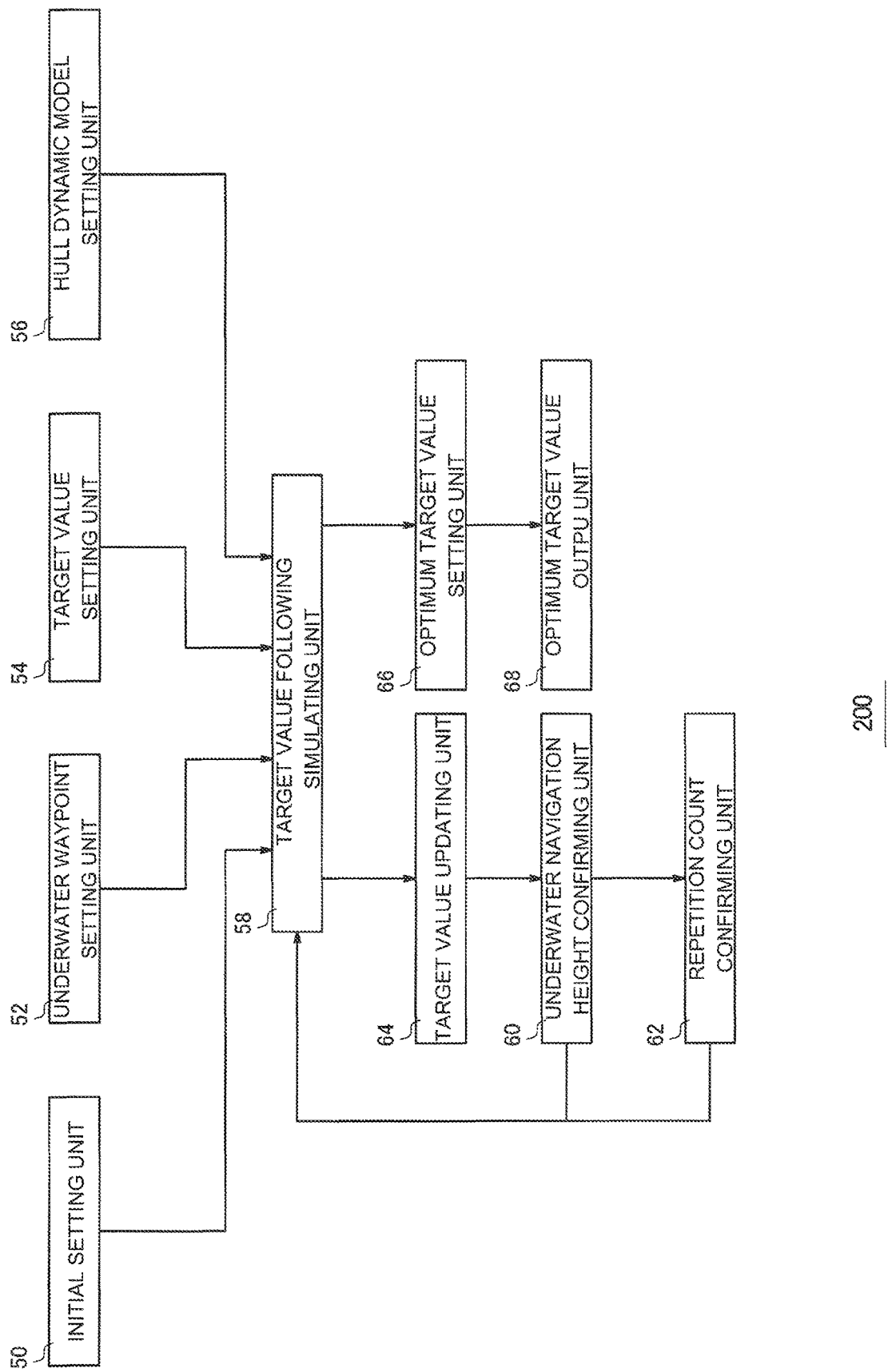
FIG. 4 is a functional block diagram of the route setting device of the underwater vehicle according to the embodiment of the invention.

The route setting process is performed along a flowchart of FIG. 3. The route setting device 200 serves as the respective units illustrated in a functional block diagram of FIG. 4 by executing the route setting process.

In step S10, an initial setting is performed. In this process, the route setting device 200 serves as an initial setting unit 50. In the initial setting, information of the submarine topography 400 is input, the maximum number of repetitions (Ne) is set, and a minimum allowable height (ha) is set as a reference using the input unit 44. The information of the submarine topography 400 is information indicating a height of topography at every coordinate of the underwater bottom in a navigation target region of the underwater vehicle 100 as illustrated with a thick solid line of FIG. 5. The maximum number of repetitions (Ne) is a maximum number of repetitions in the route setting process. The minimum allowable height (ha) is a minimum allowable height from the underwater bottom to set a route so that the underwater vehicle 100 does not come into contact with the underwater bottom.

In step S12, an input process of the underwater waypoint is performed. In this process, the route setting device 200 serves as an underwater waypoint setting unit 52. The underwater waypoints are information indicated by discrete coordinates on a navigation route of the underwater vehicle 100 in a plane (the water surface; a surface parallel to the sea surface). In other words, the underwater waypoints are sequentially connected to obtain a two-dimensional navigation route of the underwater vehicle 100. The underwater waypoints are set according to an entire underwater navigation route plan based on an observation plan in advance.

Figure 5:
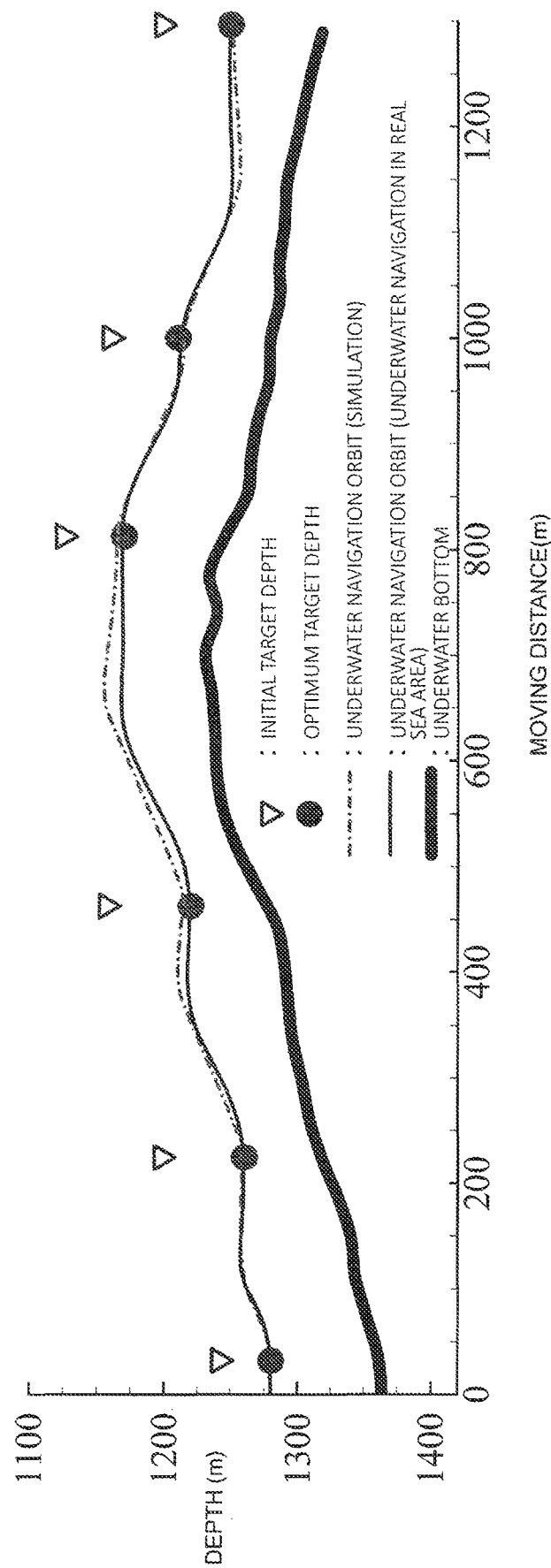
FIG. 5 is a diagram for describing a route setting process of the underwater vehicle according to the embodiment of the invention.

In step S14, initial target values at the respective underwater waypoints are set. In this process, the route setting device 200 serves as a target value setting unit 54. In this embodiment, the target value is a target depth of the underwater vehicle 100. In other words, as illustrated in FIG. 5, an initial value (illustrated as a white triangle in the drawing) of a target depth of the underwater navigation route of the underwater vehicle 100 is set for every the underwater waypoint which is input in step S12.

In step S16, the hull dynamic model is set. In this process, the route setting device 200 serves as a hull dynamic model setting unit 56. The hull dynamic model is also called AUV dynamics in which the motion of the hull 10 (or the underwater vehicle 100) in the water is obtained on the basis of calculation. Equations of motion represented by differential equations in a time domain are a typical example. As a general solution, a speed and an angular speed component as unknown quantities in the equations of motion are found using a force applied to an object and a moment component as inputs. In many cases, an initial condition is given by an analytic procedure to obtain a general solution, and a numerical procedure is used to obtain a time sequence of speeds and angular speeds as time passes. Specifically, the solution is determined on the basis of response characteristics of the main propeller 12, the vertical rudder 16, and the horizontal rudder 20, and a movement characteristic of the hull 10. When an optimum target value (the depth and the height) in the invention is obtained, there is used a procedure of updating the target value by a sequential method as illustrated in FIG. 3. However, the hull dynamic model is used as a tool for obtaining a behavior of the hull 10 (AUV) in a numerical manner by an underwater navigation simulation in the procedure. A coefficient term in the equations of motion is a function of a fluid force operating on the hull 10, and is frequently called a hydrodynamic coefficient. The hydrodynamic coefficient can be obtained by a tank test using a scale model of the hull or a numerical calculation using a procedure of a computational fluid dynamics. In the equations of motion, items other than the hydrodynamic coefficient are variables and an external force item, so that the equations of motion are completed by obtaining the hydrodynamic coefficient.

In steps S18 to S32, there are performed the underwater navigation simulation in which the underwater navigation route of the underwater vehicle 100 with respect to the target value is simulated on the basis of the dynamic model of the underwater vehicle 100 using data and the target depth of the submarine topography 400, and an optimization analysis in which a target value updating process is repeatedly performed to update the target depth and the target value (target depth) at the underwater waypoint is optimized on the basis of an objective function which is calculated on the basis of the underwater navigation route obtained in the underwater navigation simulation.

In step S18, a counter ie is set to an initial value "0." The counter ie is used to count the number of repetitions of the simulation. In step S20, "1" is added to the counter ie.

In step S22, the underwater navigation simulation is performed. In this process, the route setting device 200 serves as a target value following simulation unit 58. The processing unit 40 simulates the underwater navigation route of the underwater vehicle 100 using the information of the submarine topography 400 input in step S10, the underwater waypoint input in step S12, and the target depths of the current underwater waypoints such that the hull 10 approaches the submarine topography 400 at each underwater waypoint on the basis of the hull dynamic model set in step S16. In addition, the underwater navigation route of the underwater vehicle 100 may be simulated such that the hull 10 approaches the minimum allowable height (ha). With the simulation, there are obtained a new underwater navigation route of the underwater vehicle 100; that is, an underwater navigation depth (a distance from the water surface to the hull 10, hereinafter, referred to as a calculated underwater navigation depth), and an underwater navigation height (a distance from the underwater bottom to the hull 10, hereinafter, referred to as a calculated underwater navigation height) at each underwater waypoint.

In step S24, it is determined whether a distance (calculated underwater navigation height) from the underwater bottom at each underwater waypoint in the new underwater navigation route obtained in the simulation in step S22 is larger than the minimum allowable height (ha). In this process, the route setting device 200 serves as an underwater navigation height confirming unit 60. In a case where there is an underwater waypoint where the calculated underwater navigation height is lower than the minimum allowable height (ha), the simulation is ended and the process proceeds to step S30. In a case where there is no underwater waypoint where the calculated underwater navigation height is lower than the minimum allowable height (ha), the process proceeds to step S26.

In step S26, it is determined whether the counter ie is equal to the maximum number of repetitions (Ne). In this process, the route setting device 200 serves as a repetition count confirming unit 62. In a case where the counter ie is less than the maximum number of repetitions (Ne), the process proceeds to step S28 and, if not, the process proceeds to step S30.

In step S28, an optimization procedure is applied on the basis of the objective function to update the target depth at each underwater waypoint. In this process, the route setting device 200 serves as a target value updating unit 64. The objective function is set with respect to a specific target in the navigation of the underwater vehicle 100. For example, in a case where the hull 10 is intended to submerge from the water surface as deep as possible, a total sum of the calculated underwater navigation depths of the hull 10 in the entire underwater navigation route is set to the objective function. Then, the processing unit 40 updates the target value at each underwater waypoint such that the value of the objective function is minimized. Thereafter, the process returns to step S20 to repeat the simulation of the underwater navigation route again using the new target value.

In a case where the process proceeds to step S30, an optimum target value (optimum target depth) is set. In this process, the route setting device 200 serves as an optimum target value setting unit 66. In step S32, the processing unit 40 sets and outputs the current target depth as the optimum target depth (depicted with a black circle in the drawing) as illustrated in FIG. 5. In this process, the route setting device 200 serves as an optimum target value output unit 68. The optimum target depth is a target depth at each underwater waypoint to take the underwater navigation route as deep from the water surface as possible while keeping the minimum allowable height (ha) so as not to come into contact with the underwater bottom when the underwater vehicle 100 navigates underwater.

With the above process, when a navigation control of the underwater vehicle 100 is performed, the target depth (target depth) at each underwater waypoint is optimized. Therefore, the underwater vehicle 100 can navigate underwater in an appropriate underwater navigation route by controlling a motion control system of the underwater vehicle 100 such that the target depth at each underwater waypoint is optimized.

Further, in a case where the hull 10 is intended to approach the underwater bottom as close as possible, a total sum of the calculated underwater navigation heights of the hull 10 in the entire underwater navigation route may be set to the objective function in step S28. Then, the processing unit 40 updates the target value at each underwater waypoint such that the value of the objective function is minimized. Thereafter, the process returns to step S20 to repeat the simulation of the underwater navigation route again using the new target value. Then, in a case where the process proceeds to step S30, an optimum target value (optimum target height) is set.

With the above process, when the navigation control of the underwater vehicle 100 is performed, the target depth at each underwater waypoint is optimized. Therefore, the underwater vehicle 100 can navigate underwater in an appropriate underwater navigation route by controlling the motion control system of the underwater vehicle 100 such that the target height at each underwater waypoint is optimized. Further, when the speed of the underwater vehicle 100 is lowered, the inertial influence becomes smaller. Therefore, it is considered that the underwater navigation route may be taken deep from the water surface while avoiding the collision with the underwater bottom. However, when the speed is lowered, the vertical rudder 16 and the horizontal rudder 20 are degraded in effectiveness. Further, efficiency in inspection on the underwater bottom is also degraded, and thus there is a limitation. In addition, if the speed is increased excessively, there occur a limitation in the control system and problems in resolution and accuracy at the time of observation. Therefore, there is an appropriate speed range for every underwater vehicle 100.

In addition, in this embodiment, the objective function has been set to a total sum of the depths or the heights of the hull 10 in the entire underwater navigation route, but the invention is not limited thereto. For example, in a case where the hull 10 is intended to approach a reference route (a reference depth and a reference height) as a predetermined reference instead of approaching the underwater bottom on the basis of the submarine topography 400, a total sum of absolute values of differences between the depths of the hull 10 in the entire underwater navigation route and the reference route (the reference depth and the reference height) or a total sum of squares of the differences is set to the objective function. The target value (the target depth and the target height) may be optimized on the basis of the objective function.

In addition, in a case where the hull 10 is intended to be controlled in its attitude, an attitude (for example, an angle of the hull to make the hull 10 parallel to an inclined angle of the underwater bottom) at each underwater waypoint is set in advance as a reference. In step S28, a total sum of absolute values of differences between the attitudes (angles of the hull) of the hull 10 in the entire underwater navigation route and the reference attitude or a total sum of squares of the differences may be set to the objective function. Then, the processing unit 40 updates the target value at each underwater waypoint such that the value of the objective function is minimized. Then, in a case where the process proceeds to step S30, an optimum target value is set.

<Optimum Navigation Control of Underwater Vehicle>

Hereinafter, the navigation control of the underwater vehicle 100 will be described on the basis of the optimum target value which is set in the route setting process of the underwater vehicle 100.

Figure 6:
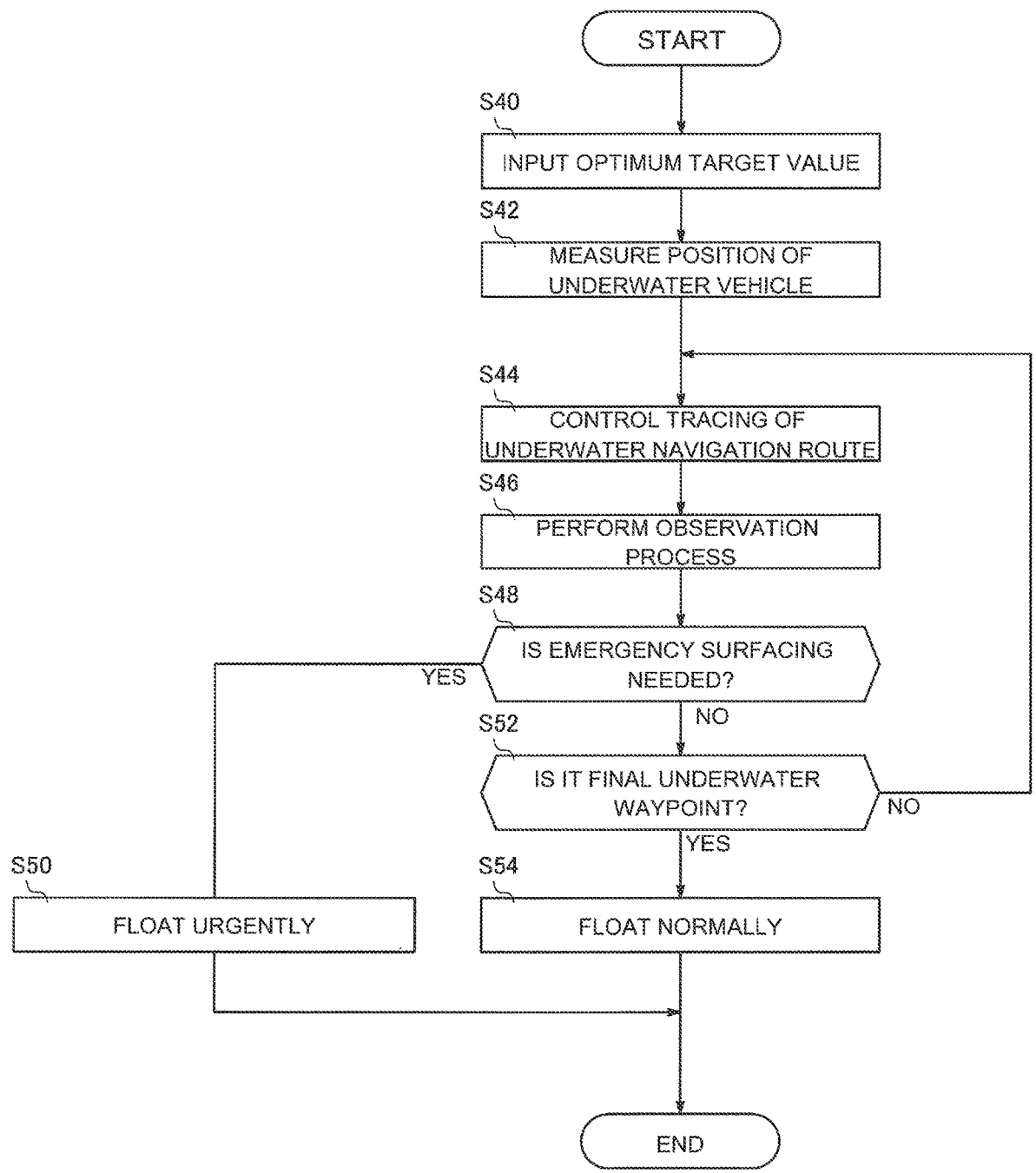
FIG. 6 is a flowchart of an optimum navigation control of the underwater vehicle according to the embodiment of the invention.
Figure 7:
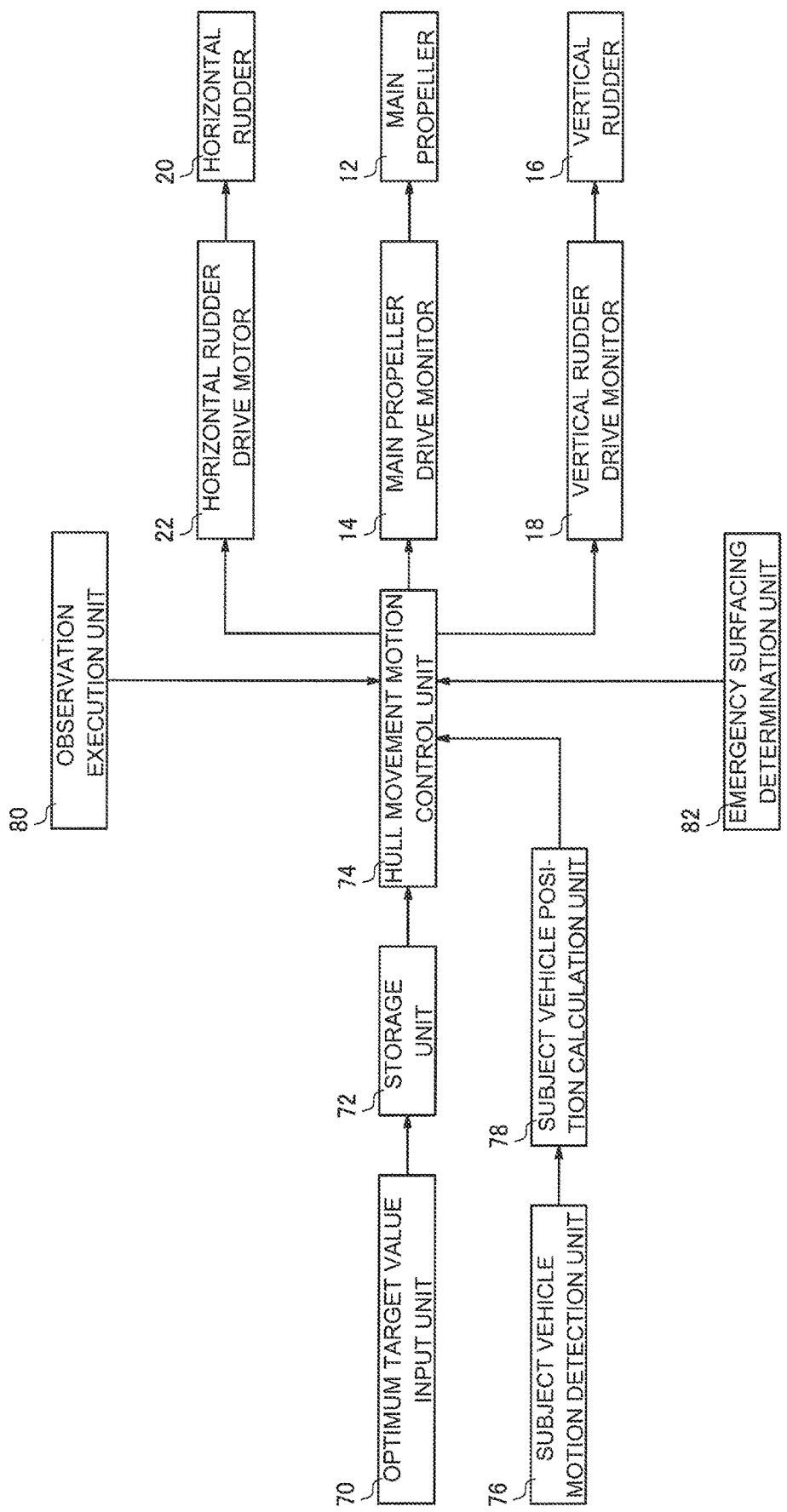
FIG. 7 is a functional block diagram of the underwater vehicle according to the embodiment of the invention.

A navigation control process is progressed along a flowchart of FIG. 6. The respective units of the underwater vehicle 100 serve as the respective units illustrated in a functional block diagram of FIG. 7 so as to realize the navigation control.

In step S40, the optimum target value (optimum target depth) is input and set. In this process, the control device 34 of the underwater vehicle 100 serves as an optimum target value input unit 70. The optimum target value (optimum target depth) set by the route setting method for the underwater vehicle 100 is input to the control device 34 through an input unit (not illustrated) of the control device 34, and is stored in a storage unit 72 of the control device 34. Herein, the input to the underwater vehicle 100 may be performed using an input device which is laid on the control device 34, or may be performed by an external interface such as the acoustic communication device 36. Further, the optimum target value is derived along a flowchart of FIG. 3 normally by the support ship 300 or according to an observation plan before the support ship 300 puts out to sea, and the optimum target value is input to the control device 34. However, the optimum target value may be derived by performing the route setting method when the control device 34 of the underwater vehicle 100 starts the underwater navigation.

In a case where the underwater vehicle 100 is applied to the autonomous underwater vehicle (AUV), the underwater vehicle 100 may receive a predetermined optimum target value (optimum target depth) and conditions from a ship on the sea, and submerge into the sea to autonomously navigate. As a merit on the control of the underwater vehicle 100 by inputting the predetermined optimum target value (optimum target depth), the underwater vehicle 100 can be accurately controlled without being affected by a delay on time taken when the underwater navigation route is repeatedly simulated.

In step S42, the position of the underwater vehicle 100 is measured by the inertial navigation device 32 and the acoustic communication device 36. The control device 34 acquires the position information of the underwater vehicle 100 which is obtained by the inertial navigation device 32. In this process, the underwater vehicle 100 serves as a subject vehicle motion detection unit 76. As described above, the control device 34 may be configured to correct the position information of the underwater vehicle 100 which is obtained by the inertial navigation device 32 on the basis of the position information obtained from the acoustic communication device 36. In this process, the underwater vehicle 100 serves as a subject vehicle position calculation unit 78.

In step S44, the underwater navigation of the underwater vehicle 100 is controlled. The control device 34 controls the navigation of the underwater vehicle 100 to sequentially trace the optimum target values (optimum target depths) at the underwater waypoints from the current position of the underwater vehicle 100 using the position information acquired in step S42. The control device 34 outputs a drive control signal, a vertical steering control signal, and a horizontal steering control signal to the main propeller drive motor 14, the vertical rudder drive motor 18, and the horizontal rudder drive motor 22 respectively so as to control the driving thereof. Thus, the main propeller 12, the vertical rudder 16, and the horizontal rudder 20 move to control the behavior of the hull 10. In addition, the motion of the hull 10 is detected by the acceleration sensor and the gyro sensor of the inertial navigation device 32 to obtain the position information from the behavior of the hull 10. With such a process, the control device 34 controls the motion of the underwater vehicle 100 such that the hull 10 has the optimum target values (optimum target depth) at each underwater waypoint. In this process, the underwater vehicle 100 serves as a hull motion control unit 74.

In step S46, a necessary observation is performed by the observation sensor 30. In other words, there is performed, for example, the observation of the submarine topography 400 which is the purpose of the underwater navigation of the underwater vehicle 100. The control device 34 may transmit an observation result to the outer side of the hull 10 through the acoustic communication device 36. In this process, the underwater vehicle 100 serves as an observation execution unit 80.

In step S48, it is determined whether there is a need for emergency surfacing. In a case where the obstacle sensor 28 detects an obstacle against the navigation of the underwater vehicle 100, the control device 34 causes the process proceed to step S50 to float the hull 10 urgently and ends the underwater navigation. On the other hand, in a case where no obstacle is detected, the process proceeds to step S52. With this process, the underwater vehicle 100 serves as an emergency surfacing determination unit 82. Further, the emergency surfacing may be performed by a command from a ship on the sea through the acoustic communication device 36.

In step S52, it is determined whether the hull reaches a final underwater waypoint. The control device 34 determines whether the hull 10 reaches the final underwater waypoint of the underwater navigation route among the predetermined underwater waypoints. If the hull reaches the final underwater waypoint, the process proceeds to step S54 to normally float the underwater vehicle 100, and the underwater navigation is ended. If the hull 10 does not reach the middle underwater waypoint, the process returns to step S44 to keep the navigation control toward the next underwater waypoint.

As described above, the underwater vehicle 100 can navigate along an underwater navigation route and in an underwater navigation attitude which are appropriate to a purpose by performing the navigation control of the underwater vehicle 100 to realize the underwater navigation route (the target values at the respective underwater waypoints) set by the route setting method for the underwater vehicle. With this configuration, an observation of the underwater vehicle 100 can be realized in an optimum state. Further, FIG. 5 illustrates a diagram for describing the route setting process of the underwater vehicle according to the embodiment of the invention, which is an example when the route setting method and the underwater vehicle 100 of this embodiment are applied to a real sea area. Submarine resources were surveyed at Myojin knoll caldera located in the sea near the Izu islands of Japan in June, 2015 using the unmanned underwater vehicle "URASHIMA" for navigation (developed by Japan Agency for Marine-Earth Science and Technology) as the underwater vehicle 100. The "URASHIMA" navigated in the entire underwater navigation area at an average height of 67 m and a minimum height of 39 m (a minimum setting height was 40 m). The "URASHIMA" is a large underwater vehicle (AUV) having an overall length of 8 m. Assuming Myojin knoll caldera has an extremely rugged underwater bottom which has a steep slope of 53 degrees at maximum, the result shows that an extremely high degree of difficulty has been cleared. When an appropriate route point is derived, an initial depth at each route point is set at 120 m above from the underwater depth of the corresponding coordinates (latitude/longitude), and an appropriate depth (optimum target value) at each route point is derived using the route setting method of the embodiment. In this way, according to the route setting method for the underwater vehicle 100 of this embodiment, it is possible to reduce the height (increase the target depth) to an average of 67 m down to 39 m at minimum with respect to the initial target value of 120 m. Further, it is proved that the navigation along a predetermined underwater navigation route can be made even in the navigation of a real sea area.

INDUSTRIAL APPLICABILITY

The invention is able to be applied to a route setting and a navigation control of an underwater vehicle as well as a movement route and a movement control of a moving body according to a predetermined condition such as topography data and a reference attitude. For example, the invention is able to be applied to a movement route setting and a movement control of an airplane and a drone.

REFERENCE SIGNS LIST

10: hull
12: main propeller
14: main propeller drive motor
14*a*: battery
16: vertical rudder
18: vertical rudder drive motor
20: horizontal rudder
22: horizontal rudder drive motor
24: depth indicator
26: height indicator
28: obstacle sensor
30: observation sensor
32: inertial navigation device
34: control device
36: acoustic communication device
38: acoustic positioning device
40: processing unit
42: storage unit
44: input unit
46: output unit
50: initial setting unit
52: underwater waypoint setting unit
54: target value setting unit
56: hull dynamic model setting unit
58: target value following simulation unit
60: underwater navigation height confirming unit
62: repetition count confirming unit
64: target value updating unit
66: optimum target value setting unit
68: optimum target value output unit
70: optimum target value input unit
72: storage unit
74: hull motion control unit
76: subject vehicle motion detection unit
78: subject vehicle position calculation unit
80: observation execution unit
82: emergency surfacing determination unit
100: underwater vehicle
200: route setting device
300: support ship
400: submarine topography
500: satellite

The invention claimed is:

1. A route setting method for an underwater vehicle, comprising:
   inputting an underwater waypoint of an underwater vehicle;
   setting an initial target value on the underwater waypoint;

simulating an underwater navigation route of the underwater vehicle with respect to the target value on the basis of a dynamic model of the underwater vehicle using data of a submarine topography as a reference and the target value;

updating the target value on the basis of an objective function which is calculated on the basis of the underwater navigation route obtained in the simulating of the underwater navigation, wherein the target value is optimally derived by repeatedly performing the simulation of the underwater navigation and the updating of the target value; and controlling, by a control device, navigation of the underwater vehicle at least based on the target value.

2. The route setting method for an underwater vehicle according to claim 1, wherein the target value is a target depth on the underwater waypoint.

3. The route setting method for an underwater vehicle according to claim 2, further comprising:

setting a minimum allowable height of the underwater vehicle, wherein, in the simulation of the underwater navigation, a calculated underwater navigation height of the underwater vehicle with respect to the target depth is simulated on the basis of the dynamic model of the underwater vehicle using the data of the submarine topography and the target depth, and the calculated underwater navigation height and the minimum allowable height are compared to derive the optimum target depth.

4. The route setting method for an underwater vehicle according to claim 3, wherein, in the updating of the target value, the target depth is updated such that a minimum value of the calculated underwater navigation height approaches the minimum allowable height in a case where there is a difference between the minimum value of the calculated underwater navigation height and the minimum allowable height.

5. The route setting method for an underwater vehicle according to claim 3, wherein a value of the objective function is a total sum of absolute values of differences between the calculated underwater navigation heights at a plurality of the underwater waypoints and the minimum allowable height, or a total sum of squares of the differences, and in the updating of the target value, the target depth is updated such that the value of the objective function is decreased.

6. The route setting method for an underwater vehicle according to claim 1, wherein the target value is a target height at the underwater waypoint.

7. The route setting method for an underwater vehicle according to claim 6, further comprising:

setting a minimum allowable height of the underwater vehicle, wherein, in the simulation of the underwater navigation, a calculated underwater navigation height of the underwater vehicle with respect to the target height is simulated on the basis of the dynamic model of the underwater vehicle using the data of the submarine topography and the target height, and the calculated underwater navigation height and the minimum allowable height are compared to derive the optimum target height.

8. The route setting method for an underwater vehicle according to claim 7, wherein, in the updating of the target value, the target height is updated such that a minimum value of the calculated underwater navigation height approaches the minimum allowable height in a case where there is a difference between the minimum value of the calculated underwater navigation height and the minimum allowable height.

9. The route setting method for an underwater vehicle according to claim 7, wherein a value of the objective function is a total sum of absolute values of differences between the calculated underwater navigation heights at a plurality of the underwater waypoints and the minimum allowable height, or a total sum of squares of the differences, and in the updating of the target value, the target height is updated such that the value of the objective function is decreased.

10. The route setting method for an underwater vehicle according to claim 1, further comprising:

setting a minimum allowable height of the underwater vehicle, wherein, in the simulation of the underwater navigation, a calculated underwater navigation height of the underwater vehicle with respect to target reference attitude is simulated on the basis of the dynamic model of the underwater vehicle using the data of the submarine topography and the target reference attitude, and the calculated underwater navigation height and the minimum allowable height are compared to derive the optimum target reference attitude.

11. The route setting method for an underwater vehicle according to claim 10, wherein, in the updating of the target value, the target reference attitude is updated such that a minimum value of the calculated underwater navigation height approaches the minimum allowable height in a case where there is a difference between the minimum value of the calculated underwater navigation height and the minimum allowable height.

12. The route setting method for an underwater vehicle according to claim 10, wherein a value of the objective function is a total sum of absolute values of differences between the calculated underwater navigation heights at a plurality of the underwater waypoints and the minimum allowable height, or a total sum of squares of the differences, and in the updating of the target value, the target reference attitude is updated such that the value of the objective function is decreased.

13. The route setting method for an underwater vehicle according to claim 1, wherein the number of repetitions of the simulation of the underwater navigation and the updating of the target value is set in advance.

14. The route setting method for an underwater vehicle according to claim 1, wherein a reference route is used instead of the data of the submarine topography.

15. The route setting method for an underwater vehicle according to claim 1, wherein reference attitude angles of the underwater vehicle at the underwater waypoint is used instead of the data of the submarine topography.

16. The route setting method for an underwater vehicle according to claim 1, further comprising:

controlling the underwater vehicle using an optimum target value obtained by the simulation.

17. The route setting method for an underwater vehicle according to claim 16, wherein the optimum target value and a position of the underwater vehicle are compared to control a motion control system of the underwater vehicle according to a comparison result.

18. An underwater vehicle comprising:

a target value acquisition unit which acquires an optimum target value, the optimum target value determined by:
- inputting an underwater waypoint of the underwater vehicle;
- setting an initial target value on the underwater waypoint;
- simulating an underwater navigation route of the underwater vehicle with respect to the target value on the basis of a dynamic model of the underwater vehicle using data of a submarine topography as a reference and the target value; and
- updating the target value on the basis of an objective function which is calculated on the basis of the underwater navigation route obtained in the simulating of the underwater navigation, wherein the target value is optimally derived by repeatedly performing the simulation of the underwater navigation and the updating of the target value;

a storage unit which stores the acquired optimum target value; and a motion control unit which controls a drive unit using the optimum target value stored in the storage unit.

19. The underwater vehicle according to claim 18, further comprising:

at least one of a depth measuring unit, a height measuring unit, and an attitude measurement unit, wherein the motion control unit compares a measurement value of at least one of the depth measuring unit, the height measuring unit, and the attitude measurement unit with the optimum target value stored in the storage unit to control the drive unit.

20. The underwater vehicle according to claim 18, further comprising:

an obstacle detection unit, wherein the motion control unit controls the drive unit according to a detection result of the obstacle detection unit.

* * * * *